United States Patent [19]
Ji et al.

[11] Patent Number: 5,696,618
[45] Date of Patent: Dec. 9, 1997

[54] ELECTRODISPLACIVE ACTUATED MIRROR ARRAY AND METHOD FOR THE MANUFACTURE THEREOF

[75] Inventors: Jeong-Beom Ji; Yong-Ki Min, both of Seoul, Rep. of Korea

[73] Assignee: Daewoo Electronics Co., Ltd., Seoul, Rep. of Korea

[21] Appl. No.: 310,450

[22] Filed: Sep. 22, 1994

[30] Foreign Application Priority Data

Sep. 23, 1993 [KR] Rep. of Korea .................. 9319454
Sep. 28, 1993 [KR] Rep. of Korea .................. 9320261

[51] Int. Cl.$^6$ .......................... G02B 7/182; G02B 26/08; H01L 41/08; H04R 17/00
[52] U.S. Cl. .................. 359/224; 359/291; 359/295; 359/855; 359/900; 310/328; 310/366; 29/25.35
[58] Field of Search .................. 359/224, 846, 359/855, 900, 291, 295; 29/25.35; 310/328, 366

[56] References Cited

U.S. PATENT DOCUMENTS

| | | | |
|---|---|---|---|
| 5,159,225 | 10/1992 | Um | 310/328 |
| 5,469,302 | 11/1995 | Lim | 359/291 |
| 5,506,720 | 4/1996 | Yoon | 29/25.35 |
| 5,550,680 | 8/1996 | Yoon | 359/295 |
| 5,552,923 | 9/1996 | Min | 29/25.35 |
| 5,585,956 | 12/1996 | Lee et al. | 359/291 |

*Primary Examiner*—Ricky D. Shafer
*Attorney, Agent, or Firm*—Anderson Kill & Olick, P.C.

[57] ABSTRACT

An array of M×N electrodisplacive actuated mirrors for use in an optical projection system is assembled by way of: (a) preparing two identical ceramic wafers; (b) forming M identical trenches thereon; (c) interlocking and bonding together to form a ceramic block; (d) forming a composite ceramic structure from the ceramic block by polishing the top and bottom surfaces thereof; (e) providing M×N signal electrodes and M+1 bias electrodes; (f) mounting on an active matrix to thereby form an array of M×N actuators; (g) placing M+1 photoresistive segments; (h) preparing places for attaching platforms, to be formed thereon a light reflecting layer; (i) forming a light reflecting layer; (j) patterning the light reflecting layer, including the platform, into an array of M×N mirrors; and (k) removing the M+1 photoresistive segments to thereby form the array of M×N electrodisplacive actuated mirrors.

22 Claims, 13 Drawing Sheets

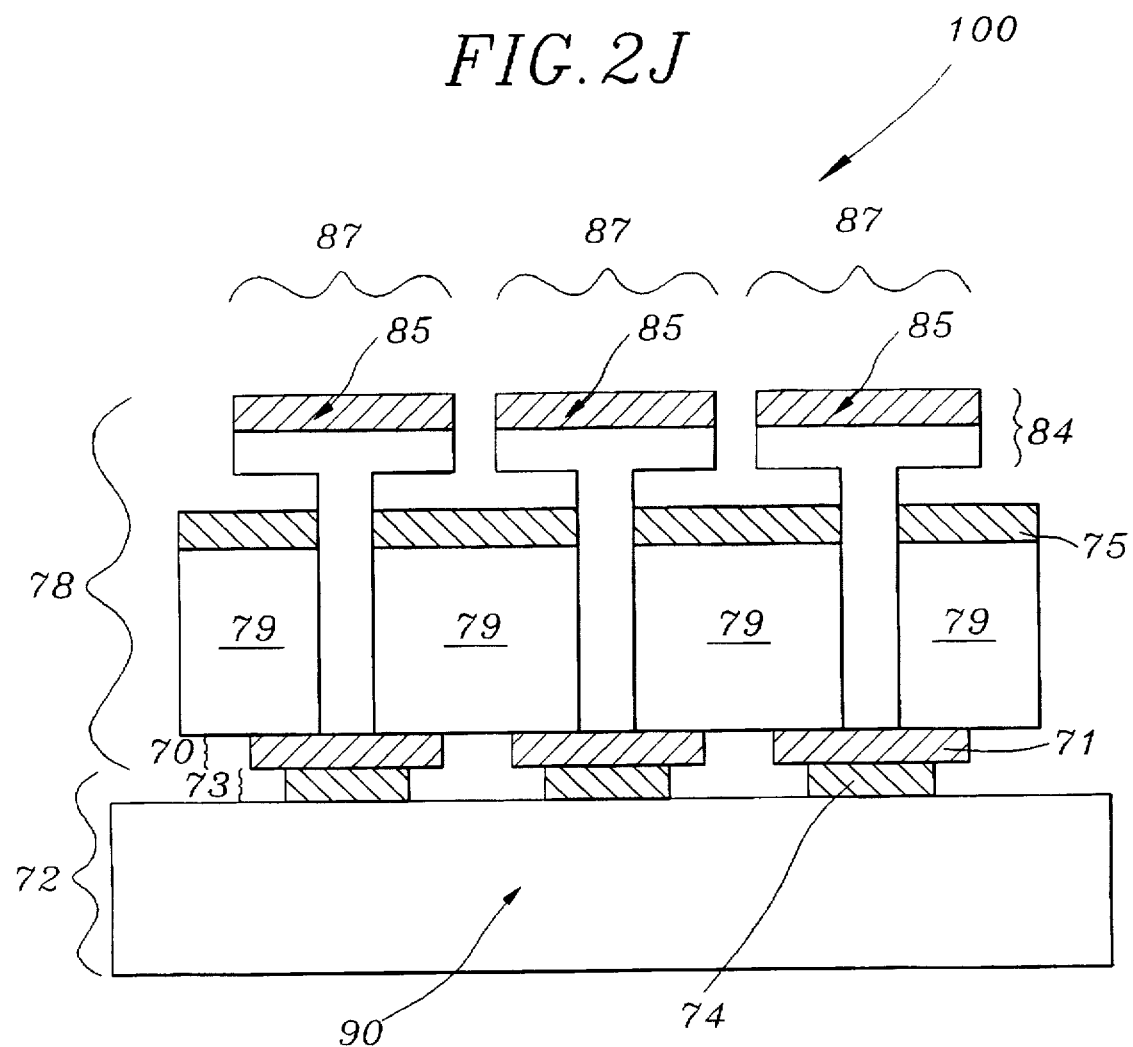

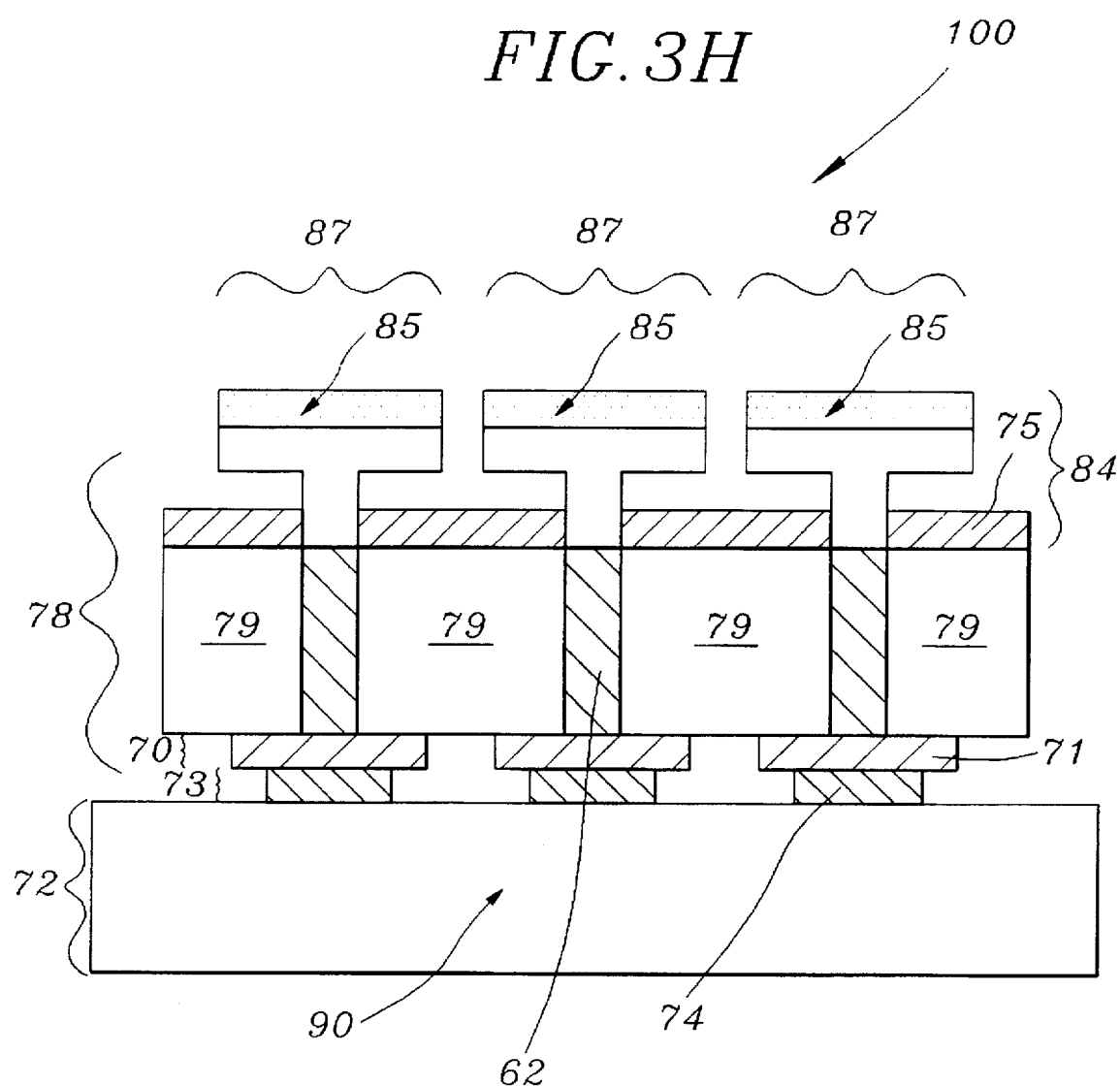

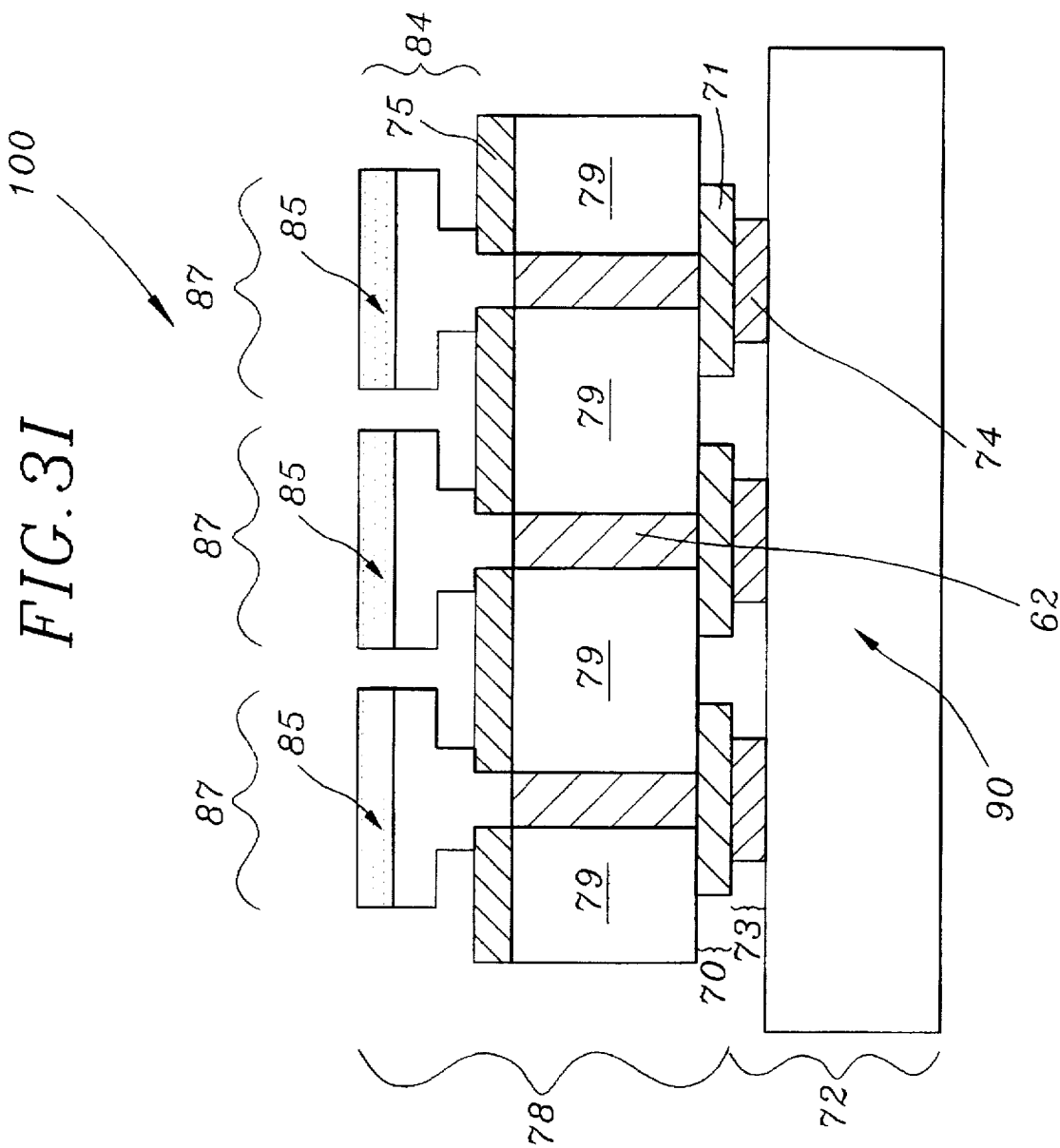

ELECTRODISPLACIVE ACTUATED MIRROR ARRAY AND METHOD FOR THE MANUFACTURE THEREOF

FIELD OF THE INVENTION

The present invention relates to an optical projection system; and, more particularly, to an array of piezoelectric actuated mirrors for use in the system and an improved method for manufacturing same.

BACKGROUND OF THE INVENTION

Among the various video display systems available in the art, an optical projection system is known to be capable of providing a high quality display in a large scale. In such an optical projection system, light from a lamp is uniformly illuminated onto an array of, e.g., M×N, actuated mirrors such that each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of a baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is shown a cross sectional view of an M×N electrodisplacive actuated mirror array 10 for use in an optical projection system, wherein the actuators are made of a piezoelectric material, disclosed in a copending commonly owned application Ser. No. 08/246,891, entitled "PIEZOELECTRIC ACTUATED MIRROR ARRAY AND METHOD FOR THE MANUFACTURE THEREOF", comprising: an active matrix 1 including a substrate 2, an array of transistors(not shown) and an array 3 of M×N connecting terminals, e.g., 4,4',4"; an array 5 of M×N piezoelectric actuators, e.g., 6,6',6", wherein each of the M×N piezoelectric actuators, e.g., 6, includes a piezoelectric member 7 having a top and a bottom surfaces, 8, 9, the top surface 8 being evenly separated by a trench 11 of a fixed depth and a centerline along a vertical direction, formed on the piezoelectric member 7, thereby generating a pair of actuating members 21,21', a signal electrode 12 located on the bottom surface 9 whose centerline along the vertical direction coincides with the centerline of the trench 11, and a pair of common reference electrodes, 13, 13', located on the separated top surface; an array 14 of M×N hinges, e.g., 15,15', 15", each of the M×N hinges, e.g., 15, being provided with a top surface 16 and a bottom surface 17 having a protrusion 18 fitted to the trench 11 in each of the M×N piezoelectric actuators 6; and an array 19 of M×N mirrors, e.g., 20,20', 20", wherein each of the M×N mirrors, e.g., 20, is mounted on the top surface 16 of each of the M×N hinges 15. The polarization directions of the piezoelectric material in the pair of actuating members 21,21' in each piezoelectric member 7, are opposite from each other.

In the above mentioned, copending, commonly owned application, there is also disclosed a method for manufacturing such an array of M×N piezoelectric actuated mirrors, the method comprising the steps of:

(1) obtaining a piezoelectric ceramic wafer having a top and a bottom surfaces; (2) forming an array of M×N signal electrodes on the bottom surface of the ceramic wafer and M+1 common reference electrodes on the top surface thereof; (3) mounting the ceramic wafer treated in accordance with above described step on an active matrix; (4) covering the M+1 common reference electrodes with M+1 photoresistive necked segments; (5) forming M trenches by using an etching method, wherein each of the M trenches, having a width of 50–70 µm and a depth of 50–100 µm, respectively, is located between two common reference electrodes and on the centerline of the signal electrodes, runs parallel to the common reference electrodes, is provided with a set of N−1 identically sized grooves, running perpendicular thereto; (6) placing an array of M×N hinges on the top surface of the ceramic wafer treated in accordance with the above described steps; (7) forming a mirror on the top surface of each of the M×N hinges; (8) removing said M+1 photoresistive necked segments; and (9) making electrical connections to thereby form an array of M×N piezoelectric actuated mirrors.

There is a number of problems associated with the above-described method for manufacturing an array of M×N electrodisplacive actuated mirrors, however. First of all, if the actuators are made of a piezoelectric material, in order for the array to function properly, the polarization directions thereof in the horizontally nearest neighboring actuators must be opposite from each other and those of the vertically nearest neighboring actuators must be the same. This is usually achieved by poling the piezoelectric material in two stages, which is an extremely difficult and also very cumbersome process.

Further, it is rather difficult and time consuming to form the M trenches, each trench having, as stated above, a width of 50–70 µm and a depth of 50–100 µm, precisely on the electrodisplacive material.

SUMMARY OF THE INVENTION

It is, therefore, a primary object of the present invention to provide a method for manufacturing an array of M×N electrodisplacive actuated mirrors, which requires less manufacturing time, less cumbersome, and is, at the same time, easier to practice.

It is another object of the present invention to provide a method for manufacturing an array of M×N piezoelectric actuated mirrors which dispenses with a poling step during the manufacturing thereof.

It is a further object of the present invention to provide a method for manufacturing an array of M×N electrodisplacive actuated mirrors, capable of readily incorporating an array of M×N hinges on an array of M×N electrodisplacive actuators.

In accordance with one aspect of the present invention, there is provided a method for manufacturing an array of M×N electrodisplacive actuated mirrors for use in an optical projection system, comprising the steps of: (a) preparing a first ceramic wafer made of an electrodisplacive material and having a flat top and a flat bottom surfaces; (b) forming M vertically directional trenches on the entirety of the flat top surface of said first ceramic wafer, wherein each of the M trenches has a pair of side surfaces and a bottom surfaces and two neighboring trenches are separated by a barrier formed therebetween, said barrier having a top surface; (c) preparing a second ceramic wafer made of said electrodisplacive material and having a flat top and a flat bottom surfaces; (d) treating said second ceramic wafer in accordance with said step(b); (e) covering the entirety of the flat top surfaces of said first and second ceramic wafers treated in accordance with said step(b), including the pair of side surfaces and the bottom surface of each of the M trenches, with an electrically nonconducting adhesive; (f) bonding together said first and second ceramic wafers treated in accordance with said steps(b) and (e) in such a way that the top surfaces of the barriers in said first ceramic wafer are in contact with the bottom surfaces of the trenches in said second ceramic wafer, thereby forming a ceramic block having a top and a bottom surfaces; (g) obtaining a composite ceramic structure having a flat top and a flat bottom surfaces by polishing the top and bottom surfaces of said ceramic block until the bottom surfaces of the trenches in said second ceramic wafer and the top surfaces of the barriers in said first ceramic wafer are completely removed, wherein the composite ceramic structure is comprised of M+1 blocks of the electrodisplacive material and M boundaries, each block being horizontally bounded by a pair of boundaries, each boundary being made of a pair of side surfaces separated by the electrically nonconducting adhesive, one of the pair of side surfaces being from said first ceramic wafer and the other side surface being from said second ceramic wafer; (h) forming an array of M×N signal electrodes on the flat bottom surface of said composite ceramic structure, each of the signal electrodes having a vertically directional centerline, coinciding with one of the M boundaries, and overlapping with two neighboring blocks; (i) mounting said composite ceramic structure treated in accordance with said steps(g) and (h) on an active matrix, having a substrate, an array of transistors and an array of connecting terminals, in such a way that each of the M×N signal electrodes is in contact with each corresponding one of the M×N connecting terminals; (j) covering the entirety of the flat top surface of said composite ceramic structure treated in accordance with said steps(g) to (i) with a layer of an electrically conducting metal, wherein the layer is provided with a top surface; (k) placing M+1 photoresistive necked segments on the top surface of the layer in such a way that each photoresistive necked segment is aligned vertically with each corresponding one of the blocks; (l) obtaining on the flat top surface of said composite ceramic structure treated in accordance with said steps(h) to (k), M vertically directional trenches, formed by removing the M boundaries, wherein each of the M trenches is further provided with N-1 horizontally directional grooves of a fixed length to thereby generate an array of M×N actuating members; (m) forming a platform with a flat top surface by covering with an epoxy the entirety of the flat top surface of said composite ceramic structure treated in accordance with said steps(g) to (l), including the M trenches; (n) providing a light reflecting layer on the flat top surface of the platform, thereby forming a mirror layer; (o) patterning the mirror layer, containing the light reflecting layer and the platform, into an array of M×N mirrors; (p) removing the M+1 photoresistive necked segments; and (q) completing electrical connections to thereby form said array of M×N electrodisplacive actuated mirrors.

In accordance with another aspect of the present invention, there is provided a method for manufacturing an array of M×N electrodisplacive actuated mirrors for use in an optical projection system, comprising the steps of: (a) preparing a first ceramic wafer made of an electrodisplacive material and having a flat top and a flat bottom surfaces; (b) forming M vertically directional trenches on the entirety of the flat top surface of said first ceramic wafer, wherein each of the M trenches has a pair of side surfaces and a bottom surface and two neighboring trenches are separated by a barrier formed therebetween, said barrier having a top surface; (c) preparing a second ceramic wafer made of said electrodisplacive material and having a flat top and a flat bottom surfaces; (d) treating said second ceramic wafer in accordance with said step(b); (e) covering the entirety of the flat top surfaces of said first and second ceramic wafers treated in accordance with said step(b), including the pair of side surfaces and the bottom surface of each of the M trenches, with an electrically nonconducting adhesive; (f) bonding together said first and second ceramic wafers treated in accordance with said steps(b) and (e) in such a way that the top surfaces of the barriers in said first ceramic wafer are in contact with the bottom surfaces of the trenches in said second ceramic wafer, thereby forming a ceramic block having a top and a bottom surfaces; (g) obtaining a composite ceramic structure having a flat top and a flat bottom surfaces by polishing the top and bottom surfaces of said ceramic block until the bottom surfaces of the trenches in said second ceramic wafer and the top surfaces of the barriers in said first ceramic wafer are completely removed, wherein the composite ceramic structure is comprised of M+1 blocks of the electrodisplacive material and M boundaries, each block being horizontally bounded by a pair of boundaries, each boundary being made of a pair of side surfaces separated by the electrically nonconducting adhesive, one of the pair of side surfaces being from said first ceramic wafer and the other side surface being from said second ceramic wafer; (h) forming an array of M×N signal electrodes on the flat bottom surface of said composite ceramic structure, each of the signal electrodes having a vertically directional centerline, coinciding with one of the M boundaries, and overlapping with two neighboring blocks (i) mounting said composite ceramic structure treated in accordance with said steps(g) and (h) on an active matrix, having a substrate, an array of transistors and an array of connecting terminals, in such a way that each of the M×N signal electrodes is in contact with each corresponding one of the M×N connecting terminals; (j) forming M+1 vertically directional, identical bias electrodes on the flat top surface of said composite ceramic structure, each of the bias electrodes completely covering each of the M+1 blocks; (k) placing M+1 photoresistive segments on top of said composite ceramic structure treated in accordance with said steps (g) to (j), wherein each photoresistive segment is placed on top of each bias electrode; (l) forming a platform with a flat top surface by covering with an epoxy the entirety of the flat top surface of said composite ceramic structure treated in accordance with said steps (g) to (k); (m) providing a light reflecting layer on the flat top surface of the platform, thereby forming a mirror layer; (n) patterning the mirror layer, including the light reflecting layer and the platform, into an array of M×N mirrors; (o) removing the M+1 photoresistive segments; and (p) completing electrical connections to thereby form said array of M×N electrodisplacive actuated mirrors.

BRIEF DESCRIPTION OF THE DRAWINGS

The above and other objects and features of the present invention will become apparent from the following description of preferred embodiments given in conjunction with the accompanying drawings, wherein:

FIGS. 2A to 2J are schematic cross sectional views illustrating the manufacturing steps in accordance with a preferred embodiment of the present invention; and FIGS. 3A to 3I represent schematic cross sectional views describing the manufacturing steps in accordance with another preferred embodiment of the present invention.

DETAILED DESCRIPTION OF THE PREFERRED EMBODIMENTS

Figure 1:
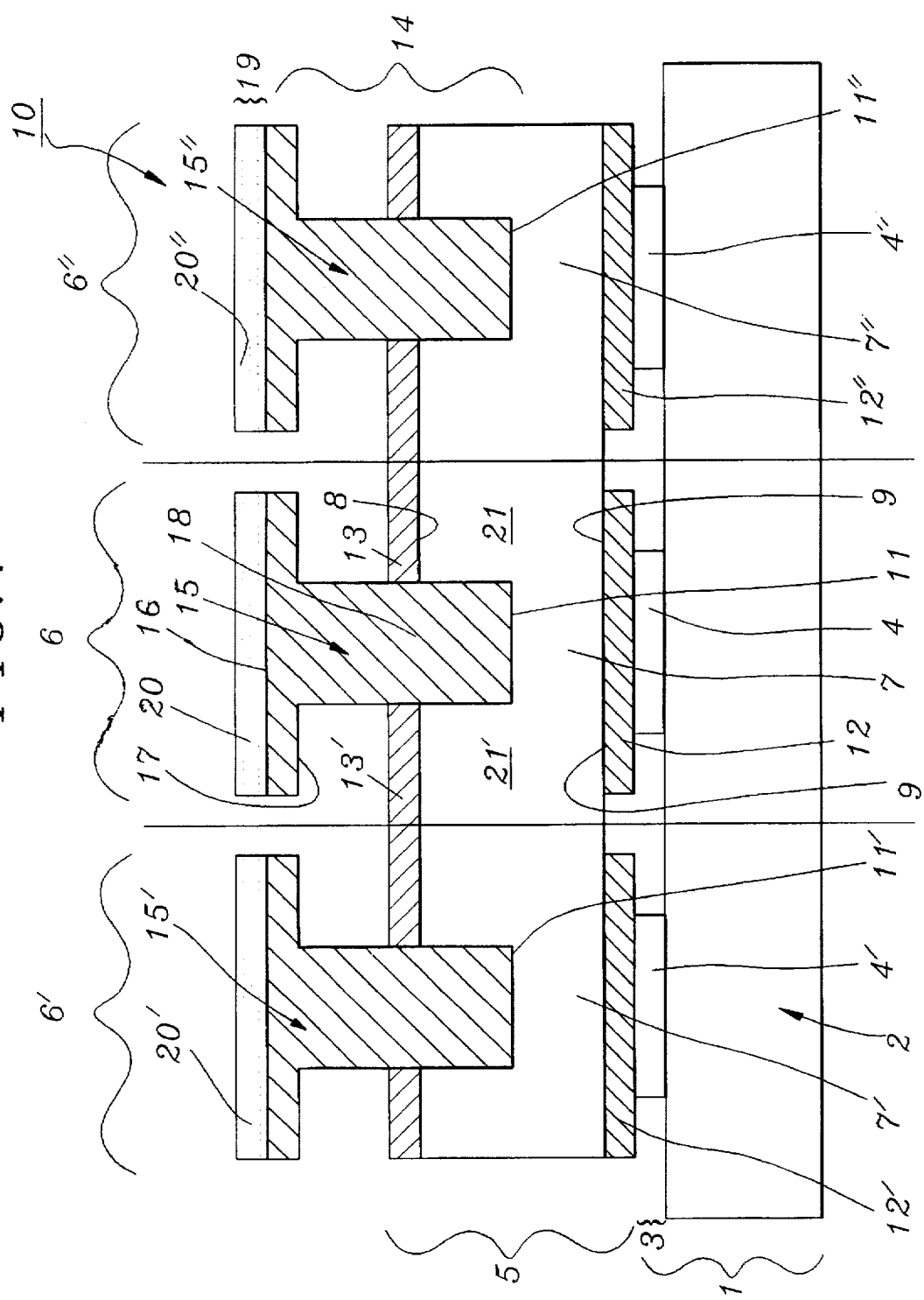
FIG. 1 shows a cross sectional view of an array of M×N electrodisplacive actuated mirrors previously disclosed.

Referring now to FIGS. 2 and 3, there are provided schematic cross sectional views of the manufacturing steps for an array of M×N electrodisplacive actuated mirrors in accordance with preferred embodiments of the present invention. It should be noted that like parts appearing in FIGS. 2 and 3 are represented by like reference numerals.

Figure 2A:
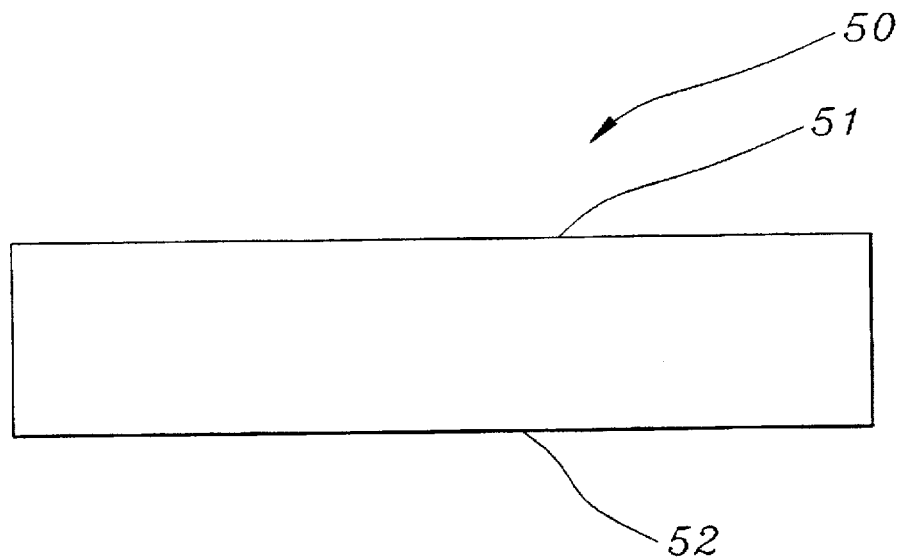

In accordance with the present invention, the process for manufacturing the inventive array of M×N electrodisplacive actuated mirrors, wherein M and N are integers, M indicating the total number of columns in the array, running parallel to the vertical direction and N, the total number of rows therein, running parallel to the horizontal direction, respectively, begins with the preparation of a first ceramic wafer 50, as shown in FIG. 2A, having a thickness of 120–150 μm, made of an electrodisplacive material such as a piezoelectric or an electrostrictive material and having a top and a bottom surfaces 51, 52, wherein the top and the bottom surfaces, 51, 52, are flat and parallel to each other.

Figure 2B:
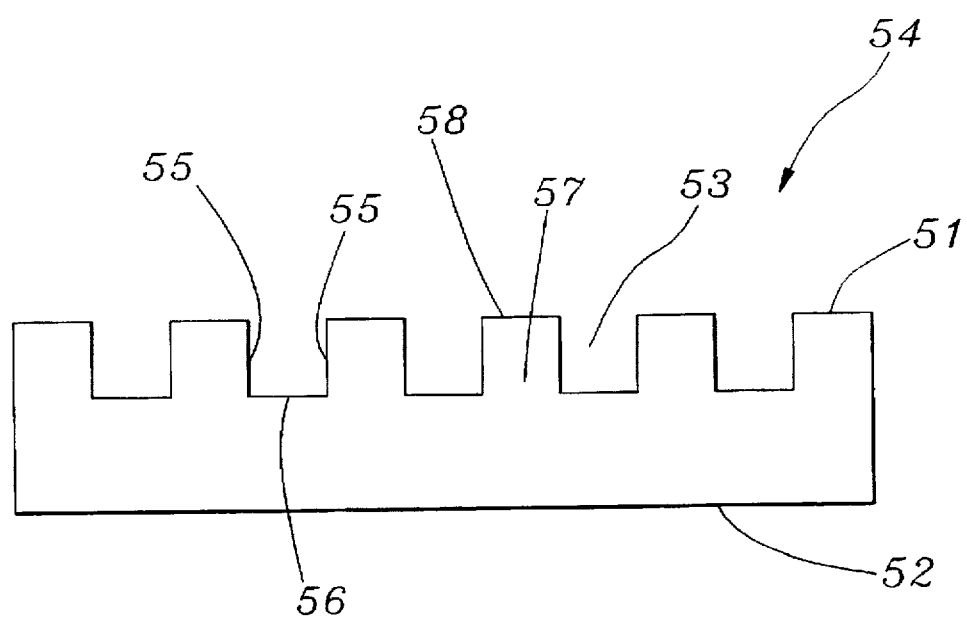

As shown in FIG. 2B, there are formed on the entirety of the top surface of the first ceramic wafer 50 M regularly spaced, vertically directional trenches of a fixed width and depth, 53, by using a mechanical means, e.g., a diamond saw, to thereby form a first ceramic structure 54, wherein each of the M trenches 53, provided with a pair of side surfaces 55 and a bottom surface 56, runs parallel to each other, is separated from each other by a barrier 57, the barrier having a flat top surface 58, and has a width of 50–80 μm and a depth of 70–100 μm.

Figure 2C:
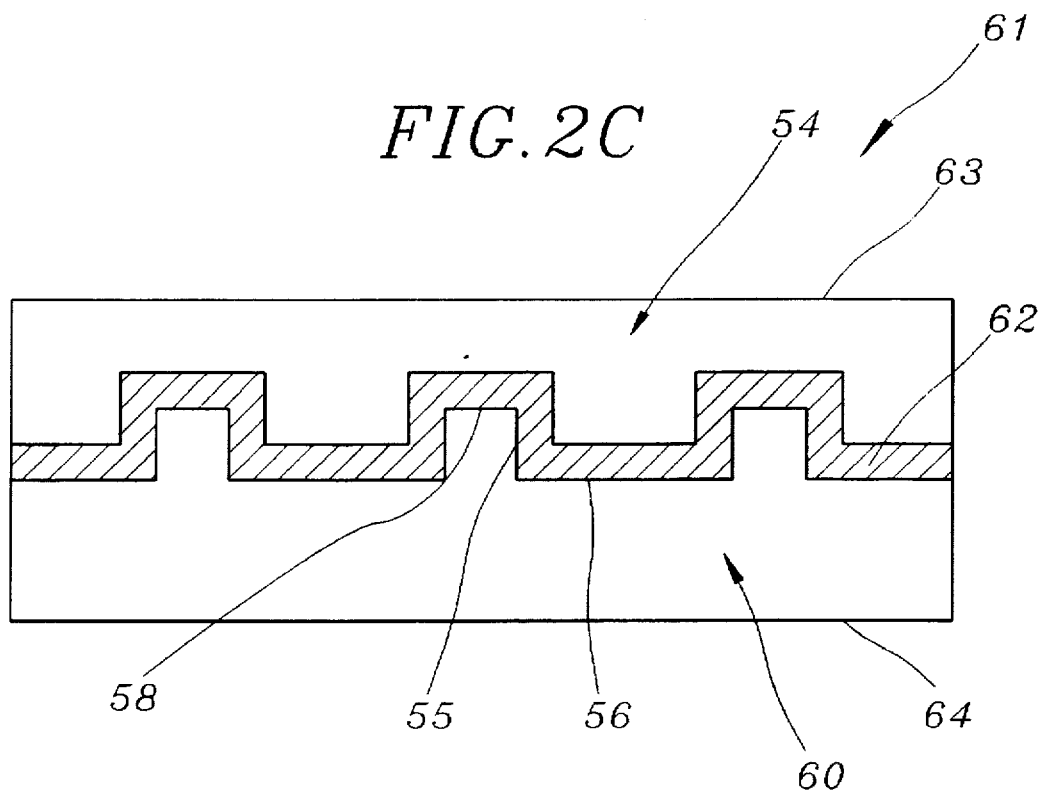

A second ceramic wafer 59, made of the same electrodisplacive material and similarly dimensioned as the first ceramic wafer 50, is processed using the above described procedure in such a way that the resulting second ceramic structure 60 has the identical top surface morphology as the first ceramic structure 54, allowing it to be fitted thereto. The two ceramic structures 54, 60 are interlocked and bonded together to form a ceramic block 61 having a top and a bottom surfaces 63, 64 using an electrically nonconducting adhesive 62, as illustrated in FIG. 2C.

Figure 2D:
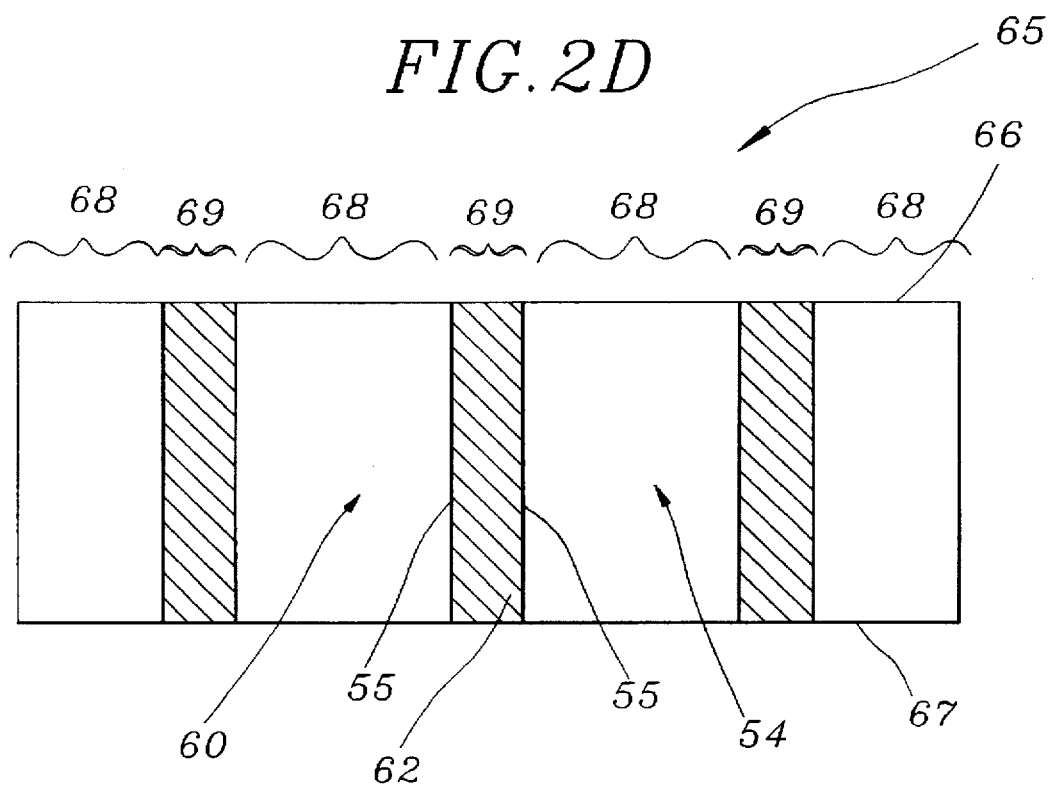

Thereafter, the top and bottom surfaces 63, 64 of the ceramic block 61 are polished until the bottom surfaces 56 of the trenches 53 in the second ceramic structure 60 and the flat top surfaces 58 of the barriers 57 in the first ceramic structure 54, or the vice versa, are completely removed, thereby forming a composite ceramic structure 65, having a flat top and a flat bottom surfaces 66, 67, wherein the composite ceramic structure 65 is comprised of M+1 blocks 68 of the electrodisplacive material and M boundaries 69, each block 68 being horizontally bounded by a pair of boundaries 69, each boundary 69 being made of a pair of side surfaces 55, separated by the electrically nonconducting adhesive 62, one of the pair of side surfaces being from the first ceramic structure 54 and the other side surface being from the second ceramic structure 60. This step is illustrated in FIG. 2D.

Figure 2E:
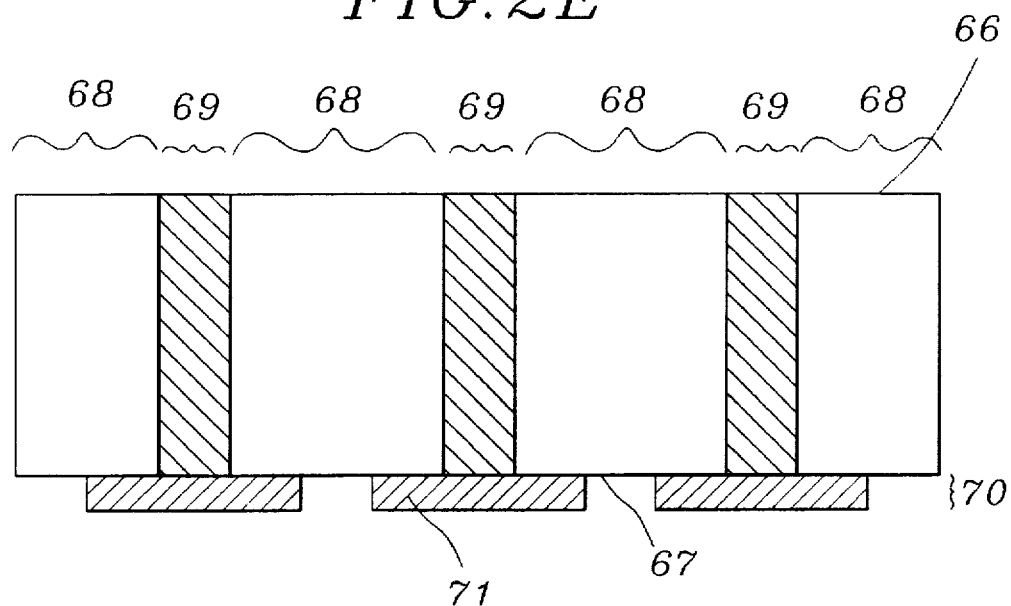

In subsequent step, there are formed on the entirety of the flat bottom surface 67 of the composite ceramic structure 60, as shown in FIG. 2E, an array 70 of M×N signal electrodes 71, wherein each of the signal electrodes 71 has a vertically directional centerline, coinciding with one of the M boundaries 69 and overlapping with two neighboring blocks 68.

The array 70 of M×N signal electrodes 71 is formed by first sputtering the flat bottom surface 67 of the composite ceramic structure 60 with an electrically conductive metal, e.g., copper (Cu), and then obtaining the required electrode pattern using a photolighography method.

Figure 2F:
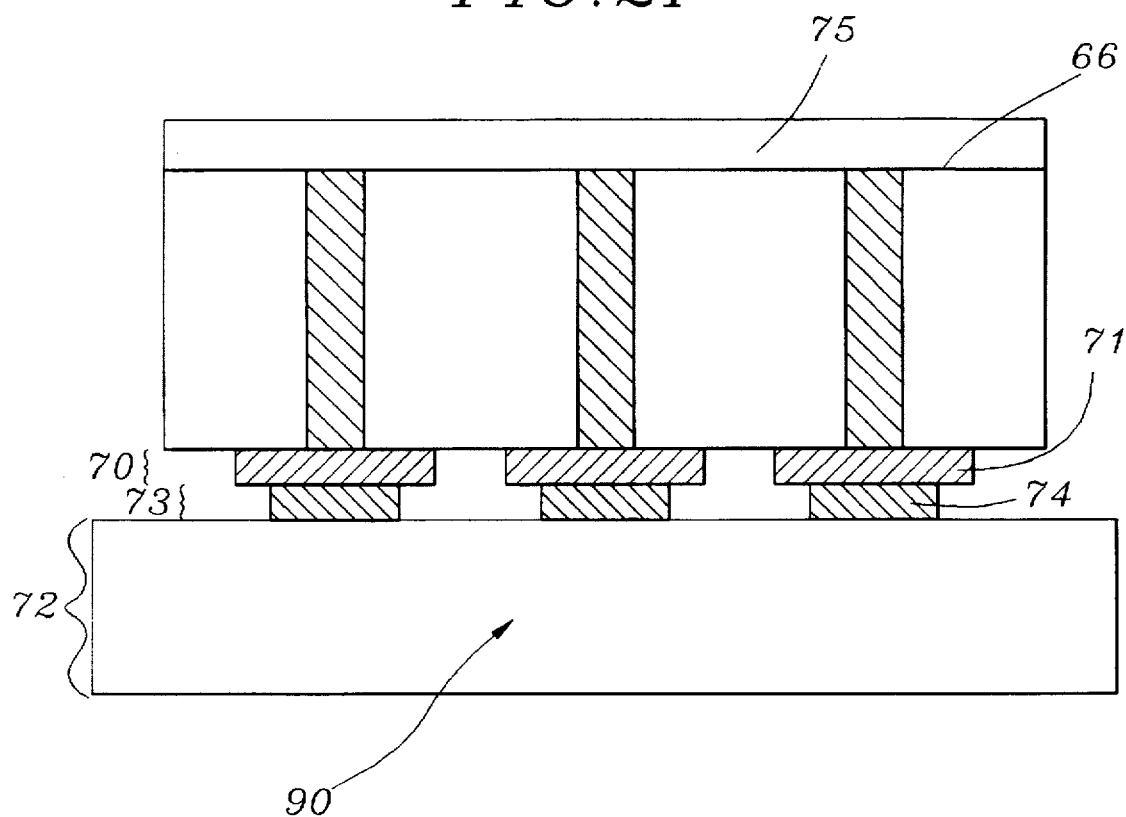

In the next step, the composite ceramic structure 60 treated in accordance with the above described steps is mounted on an active matrix 72, having a substrate 90, an array of M×N transistors (not shown) and an array 73 of M×N connecting terminals 74 using an electrically conductive adhesive in such a way that each of the M×N signal electrodes 71 is in contact with each corresponding one of the M×N connecting terminals 74. Thereafter, as shown in FIG. 2F, the entirety of the flat top surface 66 of the composite ceramic structure 60 is covered with a layer 75 of an electrically conducting metal, e.g., Cu, obtained by sputtering the electrically conducting metal thereon.

Figure 2G:
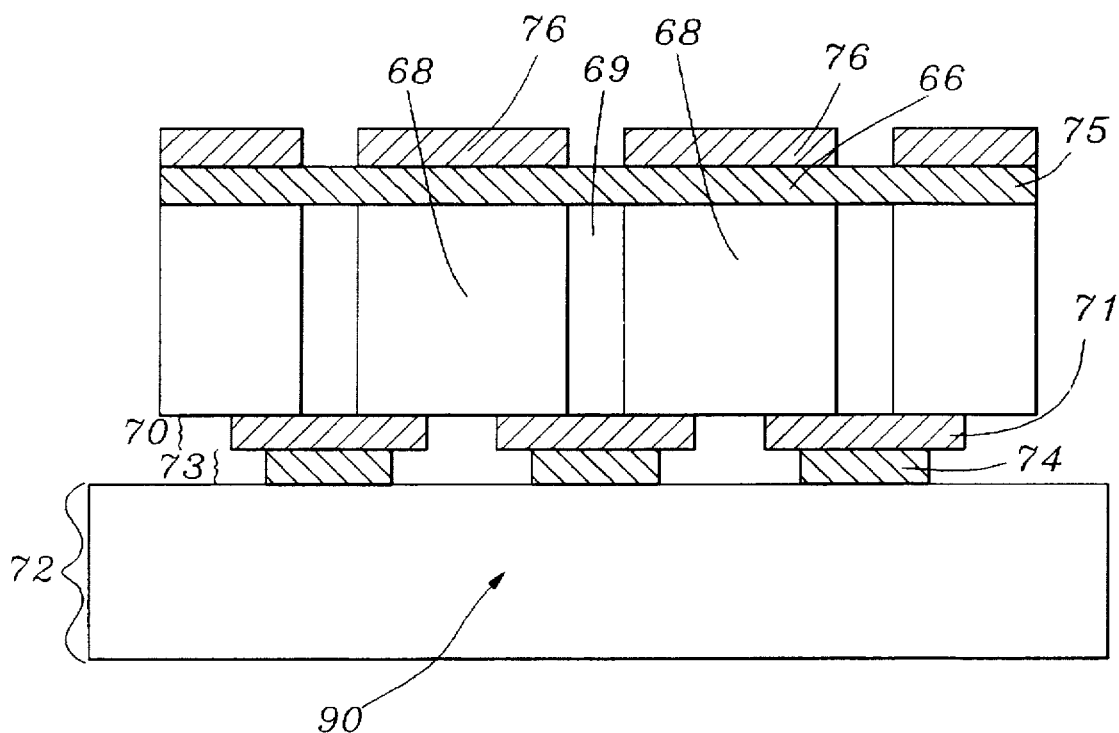

In the subsequent step, M+1 photoresistive necked segments 76 are placed on top of the layer 75 in such a way that each photoresistive necked segment covers and is aligned vertically with each corresponding one of the blocks 68. This is illustrated in FIG. 2G.

Figure 2H:
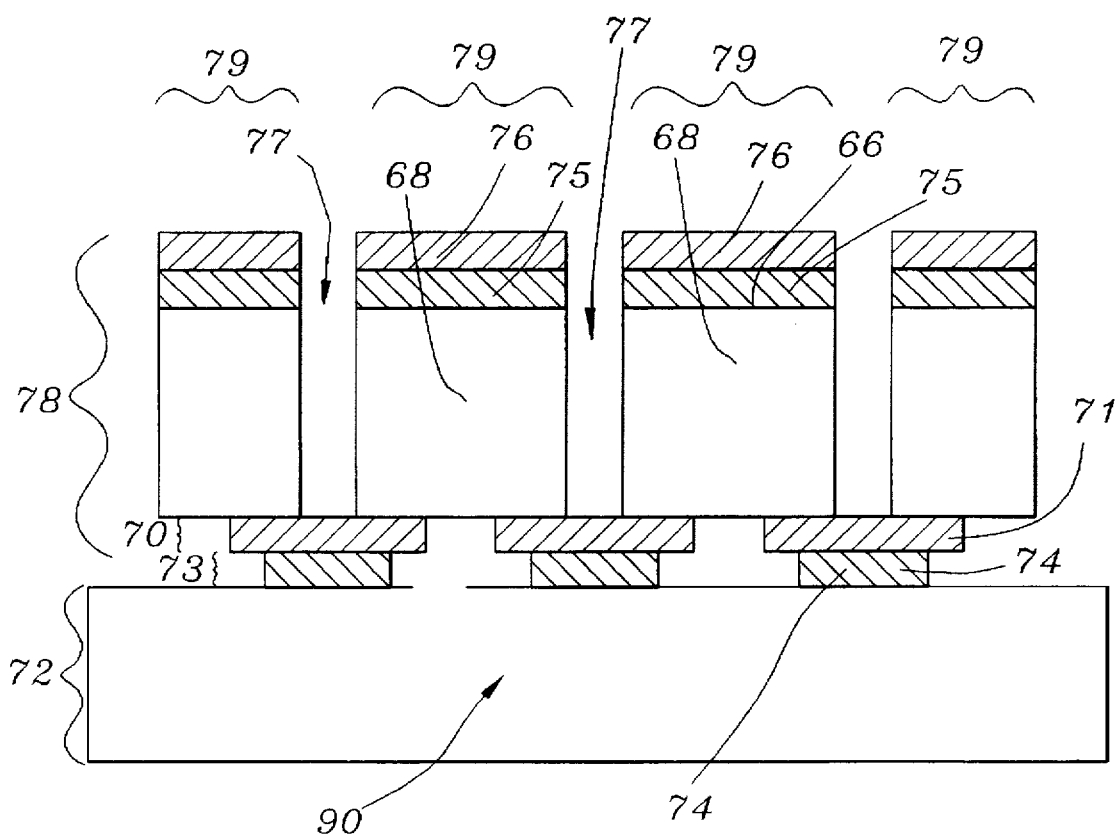
Figure 21:
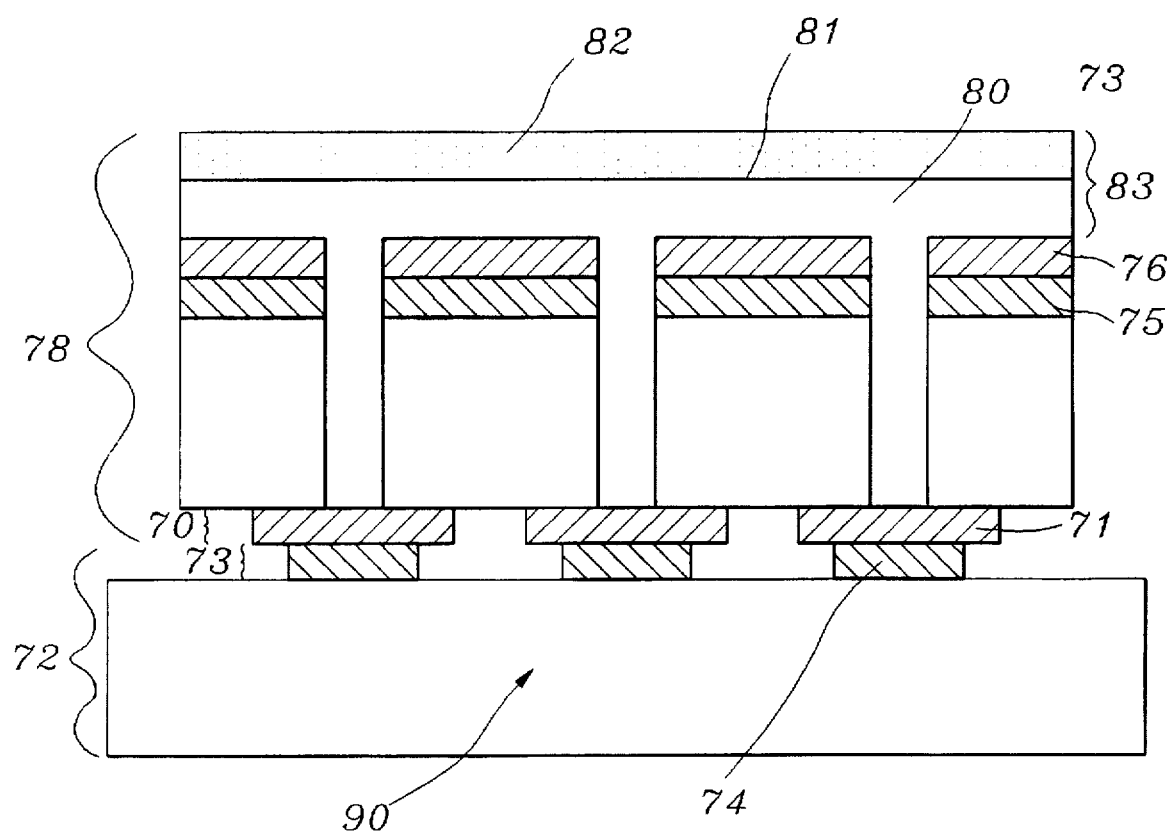
Figure 3A:
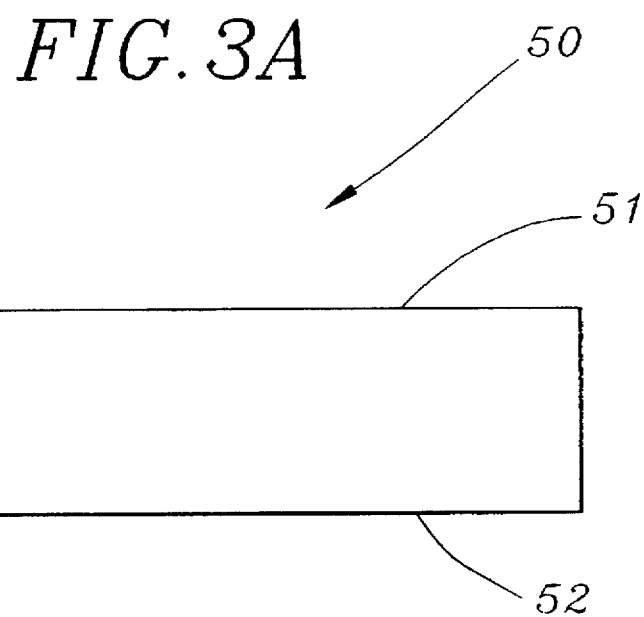
Figure 3B:
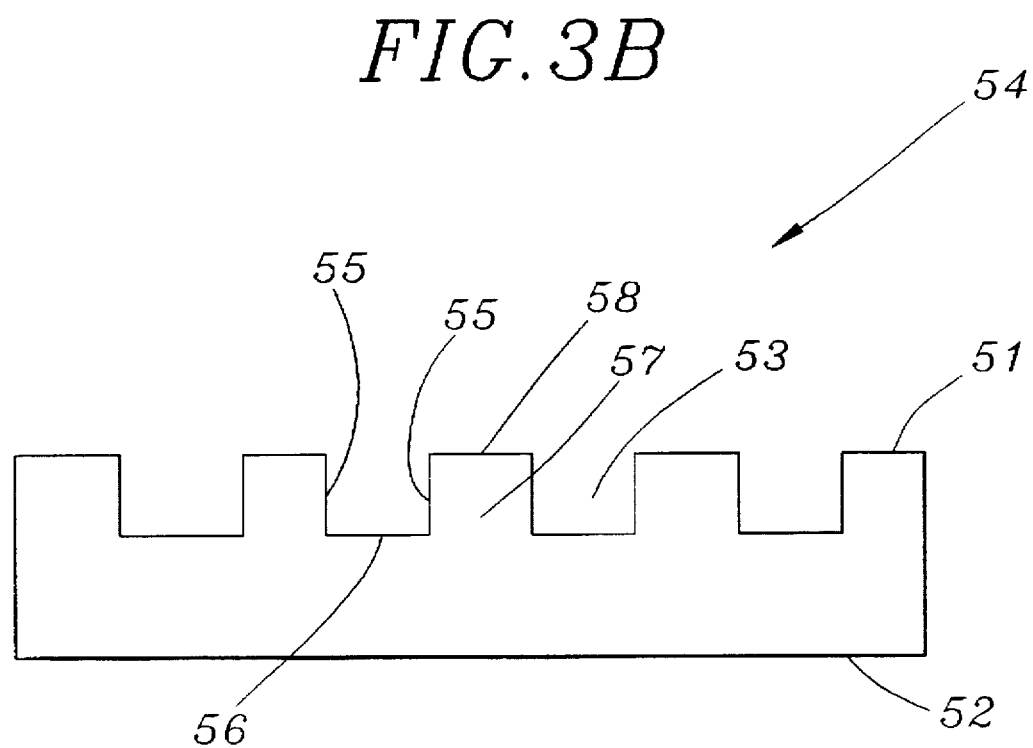
Figure 3C:
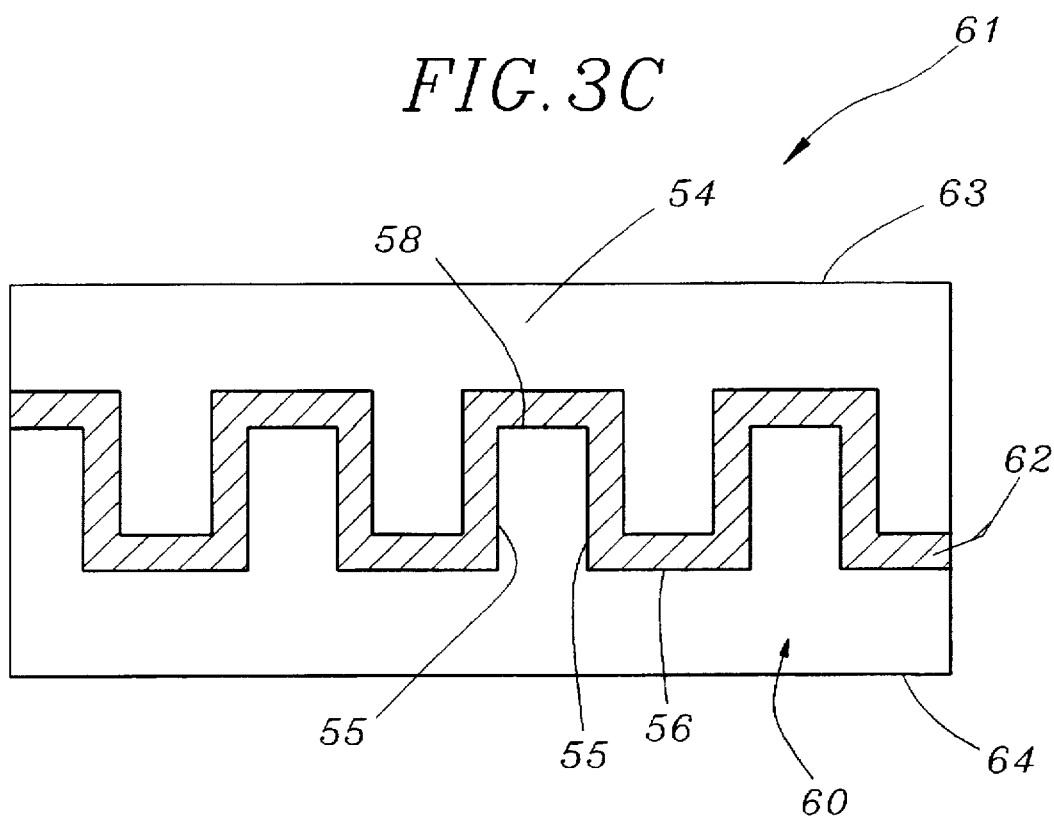
Figure 3D:
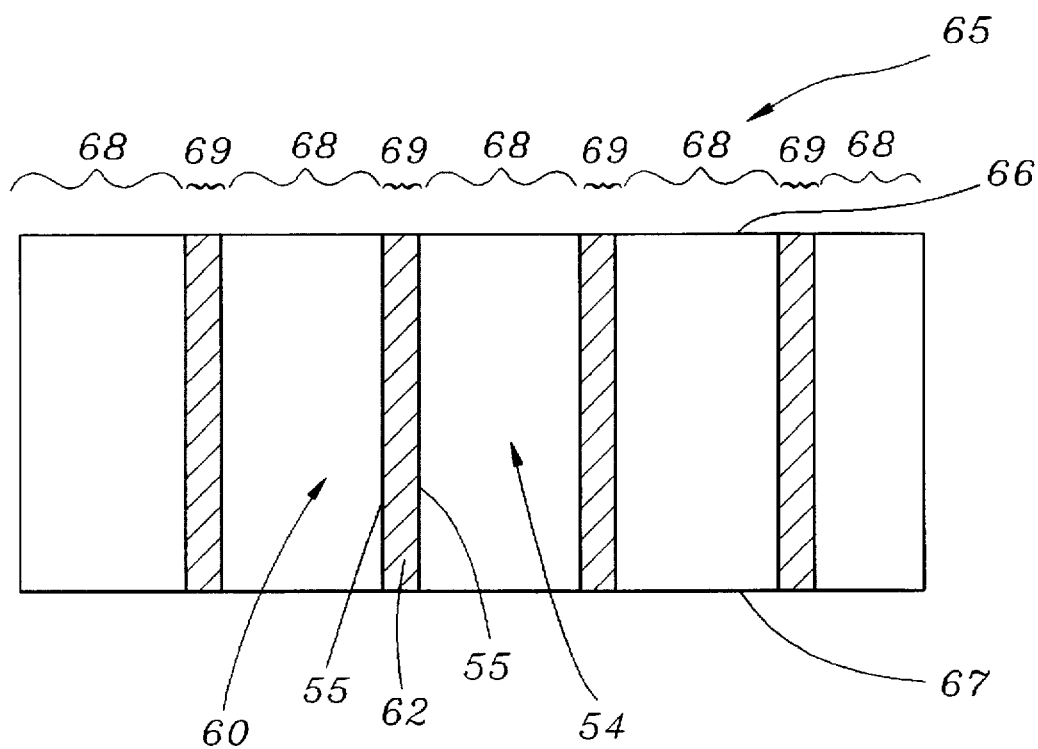
Figure 3E:
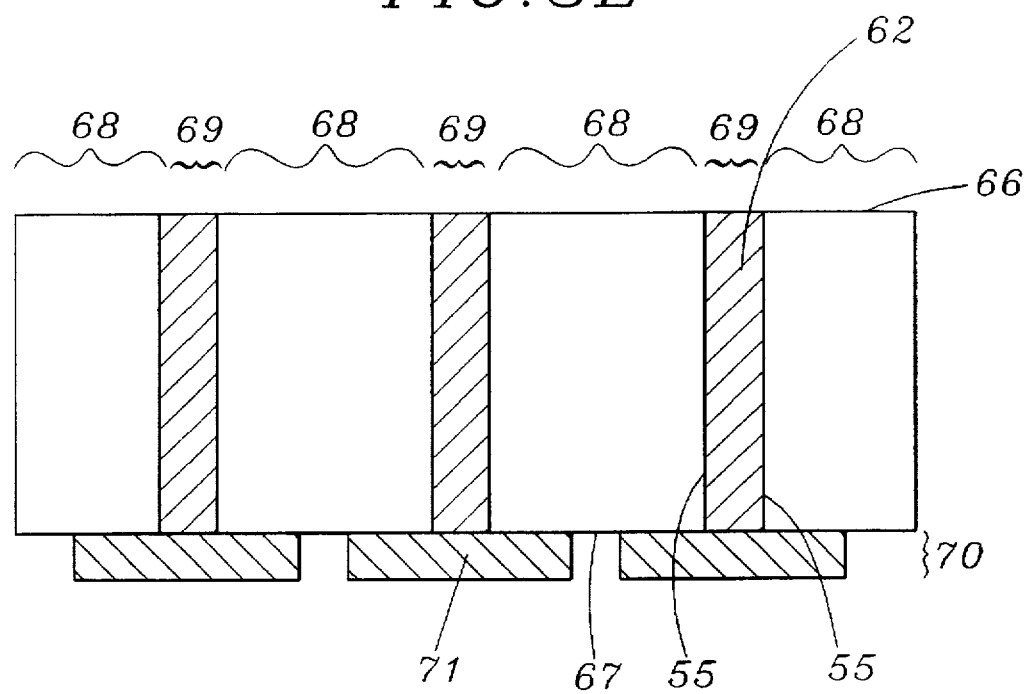
Figure 3F:
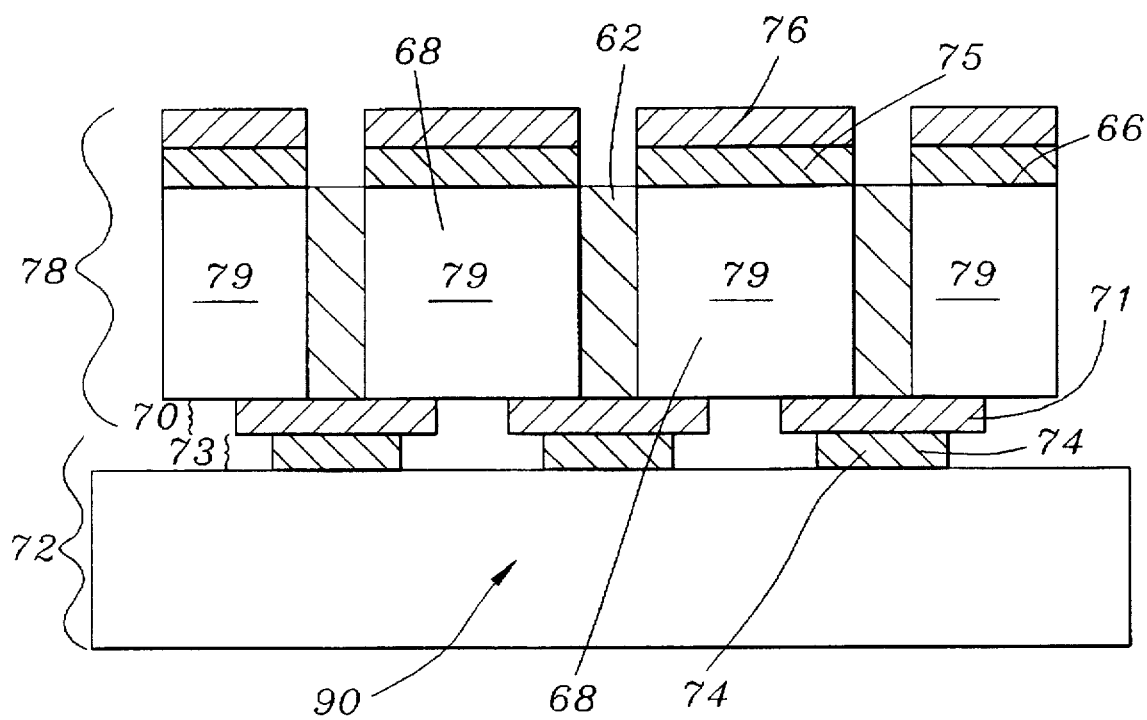
Figure 3G:
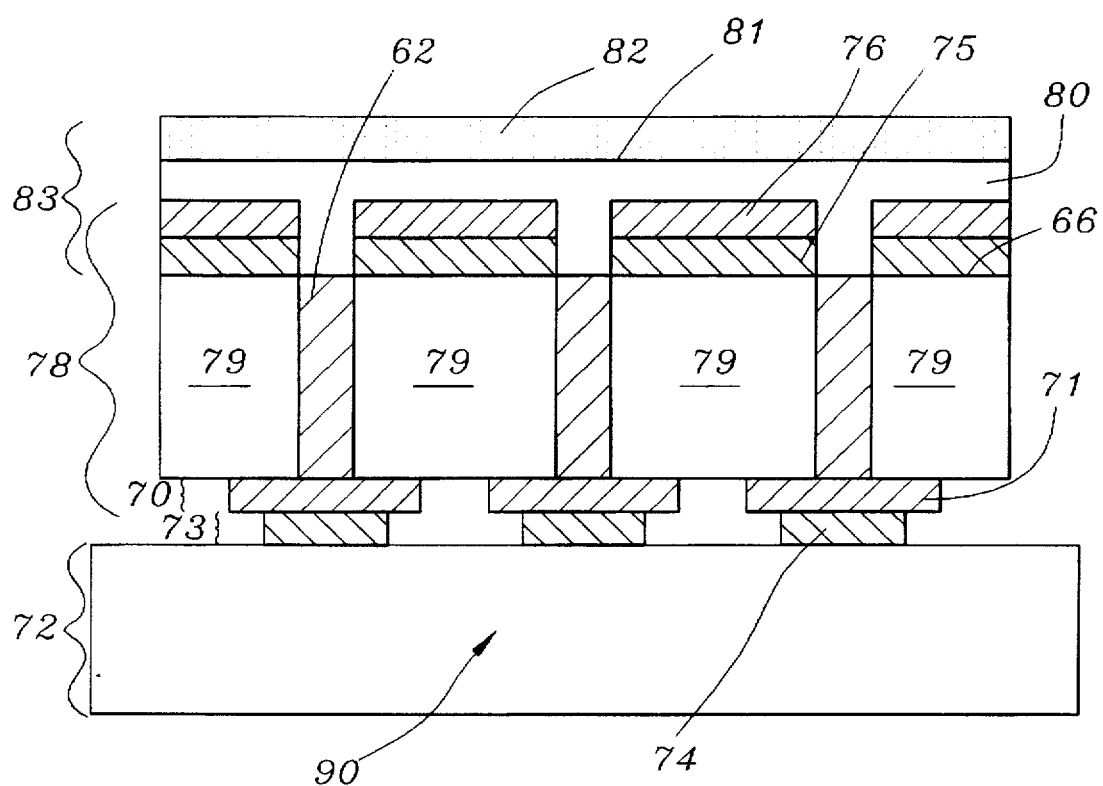

Subsequently, as shown in FIG. 2H, there are formed M vertically directional trenches 77 on the flat top surface 66 of the composite ceramic structure 65 treated in accordance with the above-described steps by removing the M boundaries 69 and the portions of the layer 75 covering them using an etching method or combinations thereof, wherein each of the M trenches 77 is further provided with N−1 horizontally directional grooves(not shown) of a fixed length to thereby generate an array 78 of M×N actuating members 79. Each of the M trenches 77 can extend, fully or partially, from the flat top surface 66 of the ceramic composite structure 65 to the N signal electrodes 71 located in the same column of the array 70.

Then, as shown in FIG. 2I, there is formed a platform 80 provided with a flat top surface 81 on the flat top surface 66 of the composite ceramic structure 65 treated in accordance with the above-described steps by covering with an epoxy the entirety thereof, including the M trenches. In the subsequent step, a light reflecting layer 82 is formed on the flat top surface 81 of the platform 80 by sputtering thereon with a light reflecting material, e.g., Al, resulting in the formation of a mirror layer 83, comprising the light reflecting layer 82 and the platform 80.

Thereafter, as shown in FIG. 2J, the mirror layer 83 is patterned into an array 84 of M×N mirrors 85 using a photolighography method. The M+1 photoresistive necked segments are then finally removed to thereby form the array 100 of M×N electrodisplacive actuated mirrors 87.

Alternatively, there are illustrated in FIGS. 3A to 3H schematic cross sectionl views of the manufacturing steps in accordance with another preferred embodiment of the present invention. As noted hereinabove, like reference numbers in FIGS. 2 and 3 represent like parts provided by like materials and processes employed in FIG. 2.

The manufacturing steps illustrated in FIGS. 2 and 3 are similar to each other, except that, in the latter method: (1) the layer 75 is patterned into the M+1 bias electrodes prior to the placing of the M+1 photoresistive segments 76 thereon; (2) the M trenches 77 and, hence, the N−1 grooves associated with each trench are not formed; and (3) since there is no need to form the M trenches and N−1 grooves, the M+1 photoresistive segments are not provided with necks.

FIG. 3I represents a cross sectional view of the array 100 of M×N electrodisplacive actuated mirror 87 obtained when each of the M+1 photoresistive segments 76 partially covers each corresponding one of the blocks 63.

In addition, if the array 100 of M×N electrodisplacive actuated mirrors 87 is made of a piezoelectric material, e.g., PZT, the first and second ceramic wafers are poled prior to undergoing the above described manufacturing steps.

While the present invention has been described with respect to certain preferred embodiments only, other modifications and variations may be made without departing from the scope of the present invention as set forth in the following claims.

What is claimed is:

1. A method for manufacturing an array of M×N electrodisplacive actuated mirrors for use in an optical projection system, comprising the steps of:

(a) preparing a first ceramic wafer made of an electrodisplacive material and having a flat top and a flat bottom surfaces;

(b) forming M vertically directional trenches on the entirety of the flat top surface of said first ceramic wafer, wherein each of the M trenches has a pair of side surfaces and a bottom surface and two neighboring trenches are separated by a barrier formed therebetween, said barrier having a top surface;

(c) preparing a second ceramic wafer made of said electrodisplacive material and having a flat top and a flat bottom surfaces;

(d) forming M vertically directional trenches on the entirety of the flat top surface of said second ceramic wafer, wherein each of the M trenches has a pair of side surfaces and a bottom surface and two neighboring trenches are separated by a barrier formed therebetween;

(e) covering the entirety of the flat top surfaces of said first and second ceramic wafers treated in accordance with said step(b) and (d), respectively, including the pair of side surfaces and the bottom surface of each of the M trenches, with an electrically nonconducting adhesive;

(f) bonding together said first and second ceramic wafers treated in accordance with said steps(b) and (e) in such a way that the top surfaces of the barriers in said first ceramic wafer are in contact with the bottom surfaces of the trenches in said second ceramic wafer, thereby forming a ceramic block having a top and a bottom surfaces;

(g) obtaining a composite ceramic structure having a flat top and a flat bottom surfaces by polishing the top and bottom surfaces of said ceramic block until the bottom surfaces of the trenches in said second ceramic wafer and the top surfaces of the barriers in said first ceramic wafer are completely removed, wherein said composite ceramic structure is comprised of M+1 blocks of the electrodisplacive material and M boundaries, each block being horizontally bounded by a pair of boundaries, each of the M boundaries being made of a pair of side surfaces separated by the electrically nonconducting adhesive, one of the pair of side surfaces being from said first ceramic wafer and the other side surface being from said second ceramic wafer;

(h) forming an array of M×N signal electrodes on the flat bottom surface of said composite ceramic structure, each of the signal electrodes having a vertically directional centerline, coinciding with one of the M boundaries, and overlapping with two neighboring blocks;

(i) mounting said composite ceramic structure treated in accordance with said steps(g) and (h) on an active matrix, having a substrate, and an array of connecting terminals, in such a way that each of the M×N signal electrodes is in contact with a corresponding connecting terminal;

(j) covering the entirety of the flat top surface of said composite ceramic structure treated in accordance with said steps(g) to (i) with a layer of an electrically conducting metal, wherein the layer is provided with a top surface;

(k) placing M+1 photoresistive necked segments on the top surface of the layer in such a way that each photoresistive necked segment is aligned vertically with each corresponding one of the blocks;

(l) obtaining on the flat top surface of said composite ceramic structure treated in accordance with said steps (h) to (k), M vertically directional trenches by removing the M boundaries, wherein each of the M trenches is further provided with N−1 horizontally directional grooves of a fixed length to thereby generate an array of M×N actuating members;

(m) forming a platform with a flat top surface by covering with an epoxy the entirety of the flat top surface of said composite ceramic structure treated in accordance with said steps(g) to (l), including the M trenches;

(n) providing a light reflecting layer on the flat top surface of the platform, thereby forming a mirror layer;

(o) patterning the mirror layer, containing the light reflecting layer and the platform, into an array of M×N mirrors;

(p) removing the M+1 photoresistive necked segments; and (q) completing electrical connections to thereby form said array of M×N electrodisplacive actuated mirrors.

2. The method of claim 1, wherein said first and second ceramic wafers are made of a piezoelectric material.

3. The method of claim 2, wherein said first and second ceramic wafers are poled.

4. The method of claim 1, wherein the M trenches are formed using a mechanical means.

5. The method of claim 1, wherein the array of M×N signal electrodes is formed by first sputtering the flat bottom surface of said composite ceramic structure with an electrically conductive metal and then patterning selectively the electrically conductive metal using a photolithography method.

6. The method of claim 1, wherein said composite ceramic structure is mounted on the active matrix using an electrically conductive adhesive.

7. The method of claim 1, wherein the flat top surface of said composite ceramic structure is covered with an electrically conductive metal using a sputtering method.

8. The method of claim 1, wherein the M trenches are obtained by using a etching method.

9. The method of claim 1, wherein said platform is made of an epoxy which solidifies under an ultraviolet light.

10. The method of claim 9, wherein the light reflecting layer is formed on the flat top surface of the platform by using a sputtering method.

11. The method of claim 10, wherein the mirror layer is patterned into the array of M×N mirrors using a photolithography method.

12. A method for manufacturing an array of M×N electrodisplacive actuated mirrors for use in an otpical projection system, comprising the steps of:

(a) preparing a first ceramic wafer made of an electrodisplacive material and having a flat top and a flat bottom surfaces;

(b) forming M vertically directional trenches on the entirety of the flat top surface of said first ceramic wafer, wherein each of the M trenches has a pair of side surfaces and a bottom surface and two neighboring trenches are separated by a barrier formed therebetween, said barrier having a top surface;

(c) preparing a second ceramic wafer made of said electrodisplacive material and having a flat top and a flat bottom surfaces;

(d) forming M vertically directional trenches on the entirety of the flat top surface of said second ceramic wafer, wherein each of the M trenches has a pair of side surfaces and a bottom surface and two neighboring trenches are separated by a barrier formed therebetween;

(e) covering the entirety of the flat top surfaces of said first and second ceramic wafers treated in accordance with said step(b) and (d), respectively, including the pair of side surfaces and the bottom surface of each of the M trenches, with an electrically nonconducting adhesive;

(f) bonding together said first and second ceramic wafers treated in accordance with said steps(b) and (e) in such a way that the top surfaces of the barriers in said first ceramic wafer are in contact with the bottom surfaces of the trenches in said second ceramic wafer, thereby forming a ceramic block having a top and a bottom surfaces;

(g) obtaining a composite ceramic structure having a flat top and a flat bottom surfaces by polishing the top and bottom surfaces of said ceramic block until the bottom surfaces of the trenches in said second ceramic wafer and the top surfaces of the barriers in said first ceramic wafer are completely removed, wherein said composite ceramic structure is comprised of M+1 blocks of the electrodisplacive material and M boundaries, each block being horizontally bounded by a pair of boundaries, each of the M boundaries being made of a pair of side surfaces separated by the electrically nonconducting adhesive, one of the pair of side surfaces being from said first ceramic wafer and the other side surface being from said second ceramic wafer;

(h) forming an array of M×N signal electrodes on the flat bottom surface of said composite ceramic structure, each of the signal electrodes having a vertically directional centerline, coinciding with one of the M boundaries, and overlapping with two neighboring blocks;

(i) mounting said composite ceramic structure treated in accordance with said steps(g) and (h) on an active matrix, having a substrate, and an array of connecting terminals, in such a way that each of the M×N signal electrodes is in contact with a corresponding connecting terminal;

(j) forming M+1 vertically directional, identical bias electrodes on the flat top surface of said composite ceramic structure, each of the bias electrodes completely covering each of the M+1 blocks;

(k) placing M+1 photoresistive segments on top of said composite ceramic structure treated in accordance with said steps (g) to (j), wherein each photoresistive segment is placed on top of each bias electrode;

(l) forming a platform with a flat top surface by covering with an epoxy the entirety of the flat top surface of said composite ceramic structure treated in accordance with said steps (g) to (k);

(m) providing a light reflecting layer on the flat top surface of the platform, thereby forming a mirror layer;

(n) patterning the mirror layer, including the light reflecting layer and the platform, into an array of M×N mirrors;

(o) removing the M+1 photoresistive segments; and (p) completing electrical connections to thereby form said array of M×N electrodisplacive actuated mirrors.

13. The method of claim 12, wherein said first and second ceramic wafers are made of a piezoelectric material.

14. The method of claim 13, wherein said first and second ceramic wafers are poled.

15. The method of claim 12, wherein the M trenches are formed using a mechanical means.

16. The method of claim 12, wherein the array of M×N signal electrodes and the M+1 bias electrodes are formed by first sputtering the flat bottom and flat top surfaces of said composite ceramic structure with an electrically conductive metal and then patterning selectively the electrically conductive metal using a photolithography method, respectively.

17. The method of claim 12, wherein said composite ceramic structure is mounted on the active matrix using an electrically conductive adhesive.

18. The method of claim 12, wherein said platform is made of an epoxy which solidifies under an ultraviolet light.

19. The method of claim 18, wherein the light reflecting layer is formed on the flat top surface of the platform by using a sputtering method.

20. The method of claim 19, wherein the mirror layer is patterned into the array of M×N mirrors using a photolithography method.

21. The method of claim 12, wherein each of the M+1 photoresistive segments fully covers each corresponding one of the M+1 bias electrodes.

22. The method of claim 12, wherein each of the M+1 photoresistive segments partially covers each corresponding one of the M+1 bias electrodes.

* * * * *